(12) United States Patent
McCallen et al.

(10) Patent No.: US 9,819,499 B2
(45) Date of Patent: Nov. 14, 2017

(54) POWER FAULT DETECTION IN TRANSCEIVERS

(71) Applicant: JDS Uniphase Corporation, Milpitas, CA (US)

(72) Inventors: Michael McCallen, Nepean (CA); Nick Costantini, Stittsville (CA)

(73) Assignee: Viavi Solutions Inc., Milpitas, CA (US)

( * ) Notice: Subject to any disclaimer, the term of this patent is extended or adjusted under 35 U.S.C. 154(b) by 435 days.

(21) Appl. No.: 14/609,473

(22) Filed: Jan. 30, 2015

(65) Prior Publication Data
US 2015/0214725 A1    Jul. 30, 2015

Related U.S. Application Data

(60) Provisional application No. 61/933,480, filed on Jan. 30, 2014.

(51) Int. Cl.
*H02H 3/00* (2006.01)
*H04L 12/10* (2006.01)

(52) U.S. Cl.
CPC .................... *H04L 12/10* (2013.01)

(58) Field of Classification Search
CPC ........... H02H 3/247; H02H 7/20; H02H 1/003
See application file for complete search history.

(56) References Cited

U.S. PATENT DOCUMENTS

| | | | |
|---|---|---|---|
| 7,302,352 B2 | 11/2007 | Chuang | 702/58 |
| 7,573,941 B2* | 8/2009 | Yang | H04M 11/062 375/222 |
| 7,809,262 B2 | 10/2010 | Mahony et al. | 398/10 |
| 7,940,118 B1 | 5/2011 | Forghani-zadeh et al. | 327/536 |
| 8,073,134 B2 | 12/2011 | Nattkemper et al. | 379/413 |
| 8,355,629 B2 | 1/2013 | Mahony et al. | 398/17 |
| 2010/0150556 A1 | 6/2010 | Soto et al. | 398/66 |
| 2010/0281518 A1 | 11/2010 | Bugenhagen | 726/3 |
| 2012/0166859 A1* | 6/2012 | Fernald | H04L 7/033 713/501 |
| 2013/0030734 A1* | 1/2013 | Ware | G01R 19/0084 702/62 |
| 2013/0089318 A1 | 4/2013 | Mahony et al. | 398/2 |

FOREIGN PATENT DOCUMENTS

| | | | |
|---|---|---|---|
| JP | 5170901 | 3/2013 | H04L 12/44 |
| JP | 2013074427 | 4/2013 | H04L 12/44 |
| WO | 2011117917 | 9/2011 | H04L 12/44 |

* cited by examiner

*Primary Examiner* — Thienvu Tran
*Assistant Examiner* — Lucy Thomas
(74) *Attorney, Agent, or Firm* — Harrity & Harrity, LLP

(57) ABSTRACT

A host voltage monitor is provided for a transceiver. The host voltage monitor may include a comparator, which compares two voltages, one representative of the present host voltage, and the other representative of a threshold voltage level for the host voltage, that may indicate an imminent loss of power. Once the threshold is crossed, an alarm and/or a fault warning data packet may be automatically generated before the power fault causes the transceiver to shut down.

22 Claims, 4 Drawing Sheets

POWER FAULT DETECTION IN TRANSCEIVERS

CROSS-REFERENCE TO RELATED APPLICATIONS

The present invention claims priority from U.S. Patent Application No. 61/933,480 filed Jan. 30, 2014, which is incorporated herein by reference.

TECHNICAL FIELD

The present disclosure relates to telecommunication equipment and methods, and in particular to power fault detection in transceivers.

BACKGROUND

Transceivers are used in optical communications networks to retransmit optical signals or to convert signals between optical and electrical domains. Recently, digital data processors have been added to transceivers, enabling new functions beyond mere signal retransmission and conversion. Nowadays, transceivers may perform packet processing, filtering, as well as participate in network testing as inline probes.

New functionalities of transceivers bring in additional requirements, such as an ability of a "graceful" shutdown in case of a power loss. This graceful shutdown may include a message that an electrical power loss is imminent, which is termed in the field as a "dying gasp" functionality.

A transceiver is typically hosted by network communications device, such as a router, a switch, a gateway, a circuit pack, customer premises equipment (CPE) box, or some other type of networking equipment. Presently, a transceiver relies on its hosts to detect and report power interruptions. The transceiver remains powered by the host via a buffer capacitor having enough charge stored to enable a message to be sent out. The power loss detection circuitry, the message generation circuitry, as well as the buffer capacitor are all provided by the host.

It may be advantageous to provide a shutdown warning capability in a transceiver device itself. Unfortunately, transceivers rarely have enough room on their printed circuit boards (PCBs) to accommodate large and bulky elements, such as buffer capacitors for storing enough electrical charge for a graceful shutdown and/or for sending out a "dying gasp" message.

SUMMARY

In one aspect of the present disclosure, a host voltage monitor may be provided in a transceiver. This host voltage monitor may not require a local energy storage component such as a capacitor. Instead, the host voltage monitor may include a comparator, which compares two voltages, one representative of the present host voltage, and the other representative of a threshold voltage level for the host voltage, that may indicate an imminent loss of power. Once the threshold is crossed, an alarm and/or a fault warning data packet may be automatically generated before the power loss causes the transceiver to shut down.

In accordance with an aspect of the disclosure, there is provided a transceiver for being hosted by a network communications device, the transceiver comprising:
 a transmitter for transmitting first data packets, a receiver for receiving second data packets, and a packet processor coupled to the transmitter and the receiver for processing the first and second data packets;
 a connector coupled to the packet processor for transmitting and receiving the first and second data packets in electrical domain to and from a host device, and for providing a host voltage from the host device; and
 a host voltage monitor for providing a fault trigger signal for the packet processor to generate a fault data packet when the host voltage drops becomes equal to or below a predetermined threshold voltage;
 wherein the host voltage monitor comprises a comparator for comparing a reference voltage, corresponding to the threshold voltage, to a variable voltage based on the host voltage, and for providing the fault trigger signal to the packet processor when the variable voltage becomes equal to or drops below the reference voltage.

The packet processor may include a dedicated fault packet generator responsive to the fault trigger signal, for generating the fault packet upon receiving the fault trigger signal. The host voltage monitor may include a DC-DC voltage converter for generating the reference voltage from the host voltage. Such a DC-DC voltage converter may provide the reference voltage at a constant level, even when the host voltage drops during an imminent power loss.

In one exemplary embodiment, the host voltage monitor may include a DC-DC voltage converter for generating a substantially constant operating voltage from the host voltage, e.g. for powering the comparator by the operating voltage. The DC-DC voltage converter may operate so that the operating voltage is below the host voltage. The host voltage monitor may further include a reference generator coupled to the DC-DC voltage converter for generating the reference voltage from the operating voltage.

In accordance with the disclosure, there is further provided a method of reporting a host voltage loss by a transceiver hosted by a network communications device, the method comprising:
 (a) generating a variable voltage based on the host voltage;
 (b) generating a reference voltage corresponding to a threshold voltage, wherein a reduction of the host voltage to a level equal to or below the threshold voltage indicates the host power failure;
 (c) comparing the variable voltage to the reference voltage;
 (d) upon determining in step (c) that the variable voltage is at a level equal to or below the reference voltage, generating a fault data packet before the host voltage becomes equal to or falls below the reference voltage.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
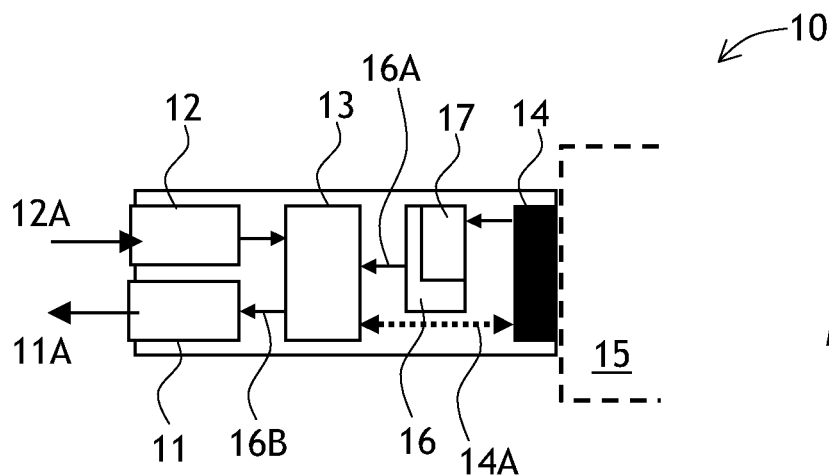
FIG. 1 illustrates a transceiver according to the present disclosure.

Referring to FIG. 1, a transceiver 10 may be provided as described below. For example, the transceiver 10 may include a transmitter 11 for transmitting first data packets 11A, a receiver 12 for receiving second data packets 12A, and a packet processor 13 coupled to the transmitter 11 and the receiver 12 for processing the first 11A and second 12A data packets, e.g. preparing the first data packets 11A for transmission, and processing the received second data packets 12A. A connector 14 may be coupled to the packet processor 13 via a bus 14A for transmitting and receiving the first 11A and second 12A data packets in electrical domain, and for providing a host voltage $V_H$ from a host device 15 for powering the elements of the transceiver 10, e.g. the transmitter 11, the receiver 12 and the packet processor 13. A host voltage monitor 16 may be provided for generating a fault trigger signal 16A for the packet processor 13 to generate a fault data packet 16B when the host voltage $V_H$ becomes equal to or drops below a predetermined threshold voltage $V_{TH}$. The host voltage monitor 16 may include a comparator 17 for comparing a reference voltage $V_{REF}$, corresponding to, but ideally less than, the threshold voltage $V_{TH}$, to a variable voltage $V_{VAR}$ based on, but ideally less than, the host voltage $V_H$, and for providing the fault trigger signal 16A to the packet processor 13 when the variable voltage $V_{VAR}$ becomes equal to or drops below the reference voltage $V_{REF}$.

Figure 2A:
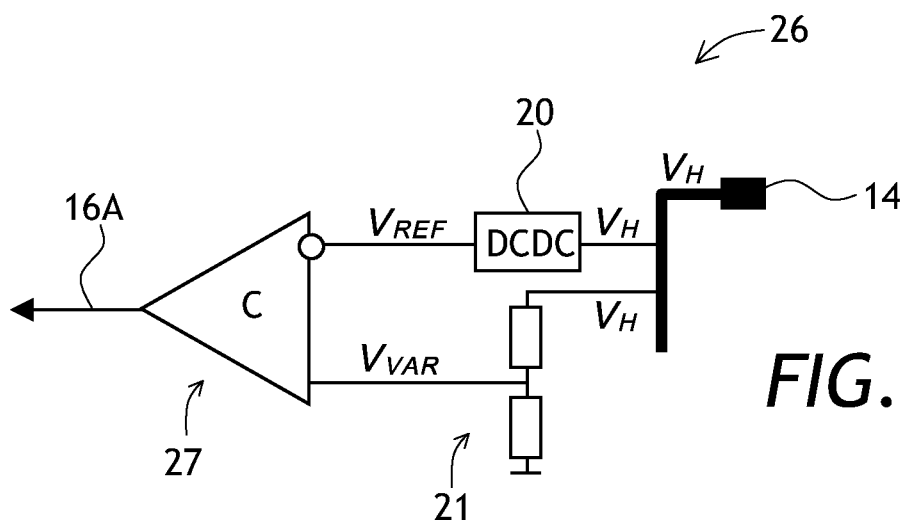
FIG. 2A illustrates an electric schematic of a host voltage monitor embodiment for the transceiver of FIG. 1.
Figure 2B:
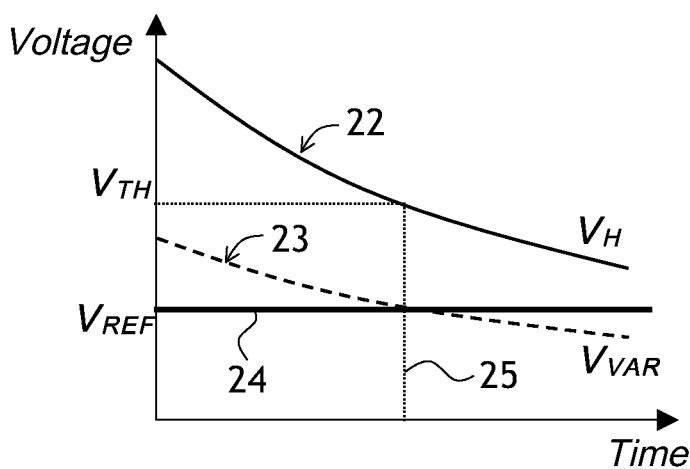
FIG. 2B illustrates electrical time traces of various voltages in the host voltage monitor embodiment of FIG. 2A.

Referring to FIG. 2A with further reference to FIG. 1, a host voltage monitor 26 is a variant of the host voltage monitor 16 of FIG. 1. The host voltage monitor 26 (FIG. 2A) may include a comparator 27 and a DC-DC voltage converter 20 for generating the reference voltage $V_{REF}$ from the host voltage $V_H$. The reference voltage $V_{REF}$ may be generated at a substantially constant level, which is maintained even though the host voltage $V_H$ may vary. By way of a non-limiting example, the reference voltage $V_{REF}$ may be generated at a level of 0.2 $V_{H0}$ to 0.5 $V_{H0}$, where $V_{H0}$ is the nominal value of the host voltage $V_H$ at normal operating conditions. The comparator 27 is a variant of the comparator 17 of FIG. 1. The host voltage monitor 26 (FIG. 2A) may further include a host voltage divider 21 for generating the variable voltage $V_{VAR}$ as a pre-determined portion p of the host voltage $V_H$: $V_{VAR}=p \cdot V_H$. By way of a non-limiting example, the portion p may be selected between 0.2 and 0.6. Referring now to FIG. 2B with further reference to FIGS. 1 and 2A, the operation of the transceiver 10 (FIG. 1) having the host voltage monitor 26 (FIG. 2A) may be illustrated as follows. During normal operation of the transceiver 10, the host voltage $V_H$ is supplied to the transceiver 10 via the connector 14. The DC-DC voltage converter 20 may convert the host voltage $V_H$ down to the reference voltage $V_{REF}$. While the host voltage $V_H$ may vary, the DC-DC voltage converter 20 keeps the reference voltage $V_{REF}$ at a substantially constant value, for as long as $V_H$ remains (approximately) larger than $V_{REF}$. The host voltage divider 21 may generate the variable voltage $V_{VAR}$ as a predetermined portion of the host voltage $V_H$.

When the power is lost in the host device 15 (FIG. 1), the host voltage $V_H$ begins to drop as indicated by a thin solid curve 22 in FIG. 2B. The variable voltage $V_{VAR}$, being a constant proportion of the host voltage $V_H$, begins to drop as well, as indicated by a thin dashed line 23. Yet, the reference voltage $V_{REF}$ stays constant, as indicated by a thick solid horizontal line 24. When the variable voltage $V_{VAR}$ decreases to a level or below the reference voltage $V_{REF}$, the comparator 27 generates the fault trigger signal 16A. This moment is indicated at 25. The reference voltage $V_{REF}$ and a ratio of the variable voltage $V_{VAR}$ to the host voltage $V_H$ are selected so that the host voltage $V_H$ becomes lower than the threshold voltage $V_{TH}$ at approximately the same moment of time 25.

Comparing the reference voltage $V_{REF}$ to the variable voltage $V_{VAR}$, instead of directly comparing the host voltage $V_H$ to the threshold voltage $V_{TH}$, has a benefit of the host voltage monitor 26 being able to remain operational (e.g. being powered by the temporarily stabilized reference voltage $V_{REF}$) for as long as the host voltage $V_H$ is still larger than the reference voltage $V_{REF}$. This may provide enough time for a graceful shutdown of the transceiver 10, including generation of the fault data packet 16B.

Figure 3A:
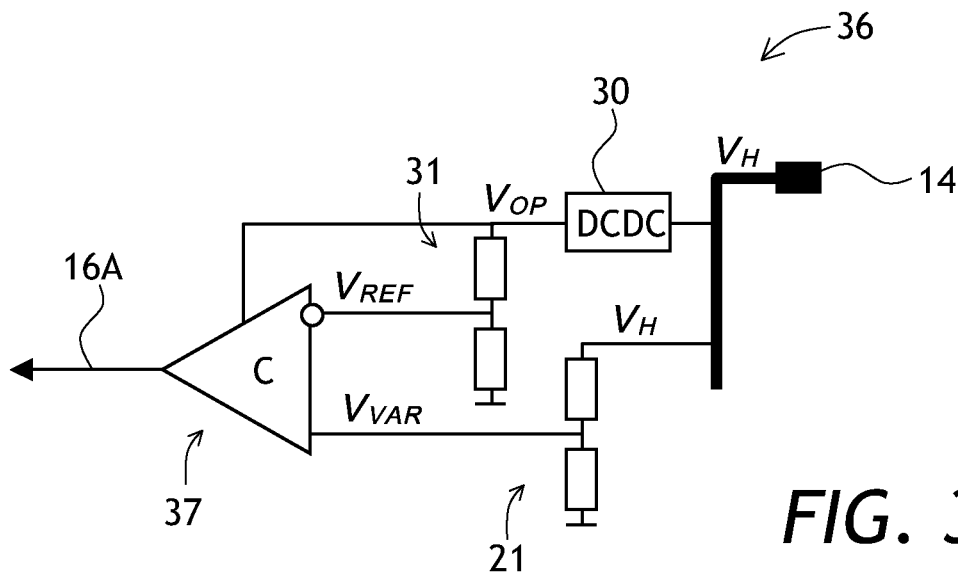
FIG. 3A illustrates an electric schematic of a host voltage monitor embodiment for the transceiver of FIG. 1.

Turning to FIG. 3A with further reference to FIGS. 1 and 2A, a host voltage monitor 36 is a variant of the host voltage monitor 16 of FIG. 1. The host voltage monitor 36 (FIG. 3A) may include a comparator 37 and a DC-DC voltage converter 30 for generating a substantially constant operating voltage $V_{OP}$ from the host voltage $V_H$, e.g. for powering the comparator 37 and/or the transmitter 11 and/or the receiver 12, etc. by the operating voltage $V_{OP}$. The comparator 27 is a variant of the comparator 17 of FIG. 1. Similarly to the host voltage monitor 26 of FIG. 2A, the host voltage monitor 36 of FIG. 3A may include the host voltage divider 21 coupled to the comparator 37 for generating the variable voltage $V_{VAR}$ as the predefined portion of the host voltage $V_H$. The host voltage monitor 36 may further include a reference generator, e.g. a reference voltage divider 31, coupled to the DC-DC voltage converter 30 for generating the reference voltage $V_{REF}$ from the operating voltage $V_{OP}$. A ratio of the reference voltage $V_{REF}$ to the operating voltage $V_{OP}$ may be selected between 0.4 and 0.6.

Figure 3B:
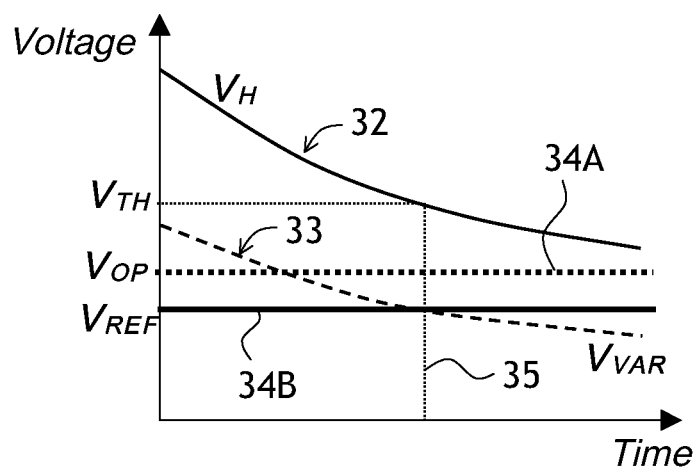
FIG. 3B illustrates electrical time traces of various voltages in the host voltage monitor embodiment of FIG. 3A.

Referring now to FIG. 3B with further reference to FIGS. 1 and 3A, the operation of the transceiver 10 (FIG. 1) having the host voltage monitor 36 (FIG. 3A) may be illustrated as follows. During normal operation of the transceiver 10, the host voltage $V_H$ is supplied to the transceiver 10 via the connector 14. The DC-DC voltage converter 30 may convert the host voltage $V_H$ down to the substantially constant operating voltage $V_{OP}$. While the host voltage $V_H$ may vary, the DC-DC voltage converter 30 keeps the operating voltage $V_{OP}$ at a substantially constant value, for as long as $V_H$ remains larger than the operating voltage $V_{OP}$. The host voltage divider 21 may generate the variable voltage $V_{VAR}$ as a pre-determined portion of the host voltage $V_H$. The reference voltage divider 31 may generate the reference voltage $V_{REF}$ as a pre-determined portion of the operating voltage $V_{OP}$. The reference voltage $V_{REF}$ is stable because the operating voltage $V_{OP}$ is already stabilized.

When a power loss event begins to occur in the host device 15, the host voltage $V_H$ begins to drop as indicated by a thin solid curve 32 in FIG. 3B. The variable voltage $V_{VAR}$, being a constant proportion of the decreasing host voltage $V_H$, begins to drop as well as indicated by a thin dashed line 33. Yet, the operating voltage $V_{OP}$ stays constant as indicated by a thick dotted horizontal line 34A. The reference voltage $V_{REF}$ also stays constant as indicated by a thick solid horizontal line 34B. When the variable voltage $V_{VAR}$ decreases to a level or below the reference voltage $V_{REF}$, the comparator 37 generates the fault trigger signal 16A. The moment when it happens is indicated by a dashed line 35. The ratios of the reference voltage $V_{REF}$ to the operating voltage $V_{OP}$; and the variable voltage $V_{VAR}$ to the host voltage $V_H$ are selected so that the host voltage $V_H$ becomes lower than the threshold voltage $V_{TH}$ at the same moment of time indicated at 35.

A specific, non-limiting example of voltages involved may be given as follows. The host voltage $V_H$=3.3V may be provided by the host device 15 via the connector 14 The DC-DC voltage converter 30 provides the operational voltage $V_{OP}$=2.5V even when the host voltage $V_H$ drops to 2.6V. The comparator 37 may be powered by the operational voltage $V_{OP}$=2.5V. The fault trigger signal 16A will be triggered when the host voltage $V_H$ drops below a predetermined threshold, e.g. 3.3V-10% to 15%, e.g. 3.3V-12.5% threshold. This percentage drop is fixed, but may be adjusted if needed. 3.3V-5% is the specified minimum operating voltage for small form pluggable (SFP) transceivers.

During normal use, the comparator 37 compares the reference voltage $V_{REF}$, e.g. 1.2V, from the reference voltage divider 31, to the variable voltage $V_{VAR}$ provided by the host voltage divider 21. The host voltage divider 21 may be set to output the variable voltage $V_{VAR}$=1.37V when the host voltage $V_H$=3.3V at the dividing ratio of 1.37/3.3≈0.415. At this dividing ratio, the variable voltage $V_{VAR}$=1.2V when the host voltage $V_H$=2.89V. As the host voltage $V_H$ drops from the main input voltage of 3.3V to the predetermined threshold voltage of 2.89V, the output of the host voltage divider is reduced correspondingly until it reaches the reference voltage $V_{REF}$=1.2 V, causing the fault trigger signal 16A to be generated. While the host voltage $V_H$ keeps dropping from 2.89V to about 2.6V, the transceiver 10 still remains operational, enabling the packet processor 13 to generate the fault data packet 16B.

The above example illustrates that comparing the reference voltage $V_{REF}$ to the variable voltage $V_{VAR}$, instead of comparing the host voltage $V_H$ to the threshold voltage $V_{TH}$, enables the host voltage monitor 16 to remain operational for as long as the host voltage $V_H$ is still larger than the operating voltage $V_{OP}$, by a small value e.g. 0.1V. This operational time interval may be sufficient for a graceful shutdown of the transceiver 10, including generation of the fault data packet 16B. Furthermore, the operating voltage $V_{OP}$ generated by the DC-DC voltage converter 30 may be conveniently used for powering the comparator 37 (FIG. 3A) and/or the transmitter 11, the receiver 12, the packet processor 13, etc. (FIG. 1). As the above example illustrates, the operating voltage $V_{OP}$ may remain at a substantially constant level as the host voltage $V_H$ drops, thereby ensuring a stable operation of electronic components powered by the operating voltage $V_{OP}$ during the graceful shutdown procedure.

Figure 4:
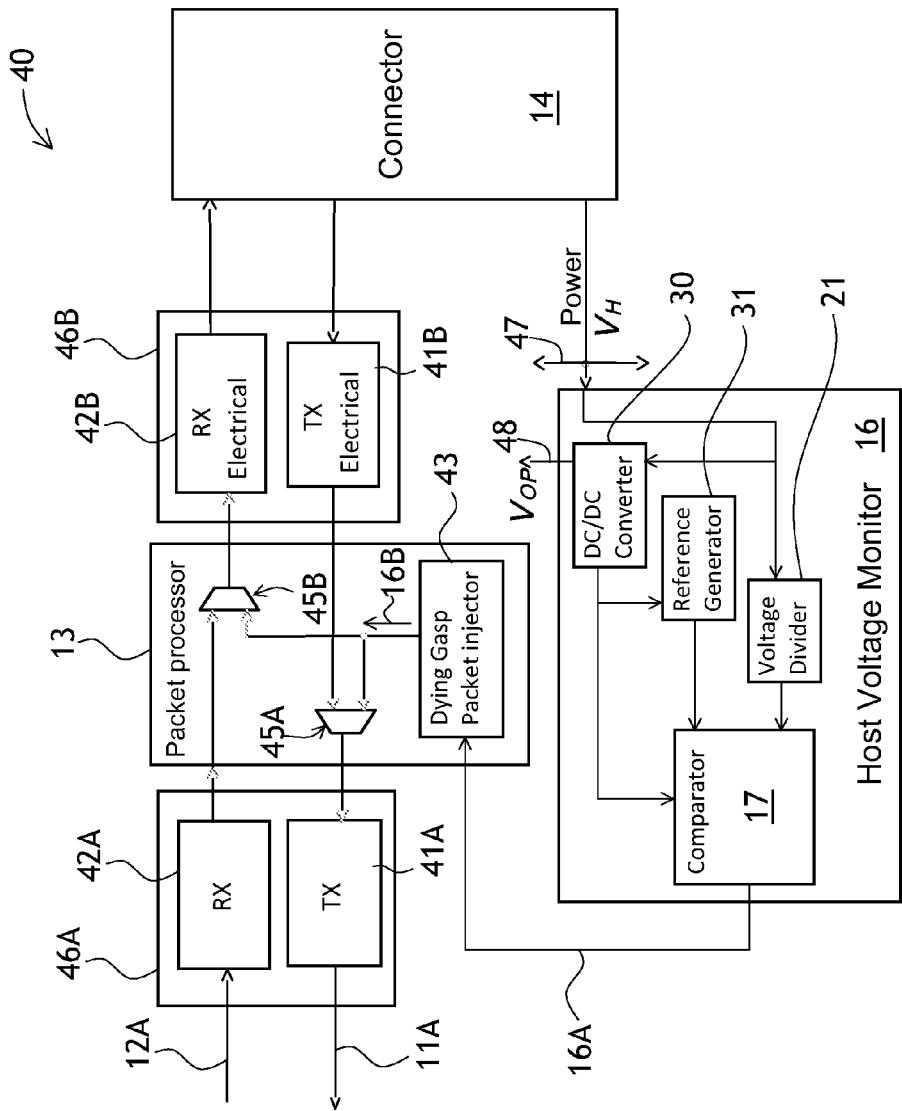
FIG. 4 illustrates a block diagram of an embodiment of the transceiver of FIG. 1.

Referring to FIG. 4 with further reference to FIGS. 1 and 3A, a transceiver 40 is a variant of the transceiver 10 of FIG. 1. The transceiver 40 (FIG. 4) may include optical 41A and electrical 41B transmitter portions, and optical 42A and electrical 42B receiver portions each coupled to the packet processor 13. The electrical portions of the transmitter 41B and the receiver 42B may be coupled to the connector 14 for transmitting and receiving the first 11A and second 12A data packets in the electrical domain.

In the embodiment shown, the packet processor 13 includes a fault packet generator ("dying gasp packet injector") 43 responsive to the fault trigger signal 16A by injecting the fault data packet 16B into outgoing traffic e.g. using a left add module 45A, thereby generating the fault data packet 16B upon receiving the fault trigger signal 16A. Similarly, the fault packet generator 43 may inject the fault data packet 16B into incoming traffic e.g. using a right add module 45B. An optical interface 46A including the optical transmitter portion 41A and the optical receiver portion 42A; an electrical interface 46B including the electrical transmitter portion 41B and the electrical receiver portion 42B; and/or the packet processor 13 may be powered via a host voltage $V_H$ bus 47, or via an operating voltage $V_{OP}$ bus 48. The packet processor 13 may include a digital signal processor (DSP) and/or a field programmable gate array (FPGA), not shown. The DSP or FPGA are preferably fast enough to generate the fault data packet 16B within 25 microseconds of receiving the fault trigger signal 16A from the comparator 37. In one embodiment, the transmitter portions 41A, 41B; the receiver portions 42A, 42B; the packet processor 13; the connector 14; and the host voltage monitor 16 of the transceiver 40 of FIG. 4 are disposed within, or supported by, a SFP package, not shown. The transceiver 10 of FIG. 1 may also be implemented in an SFP package, not shown.

Figure 5:
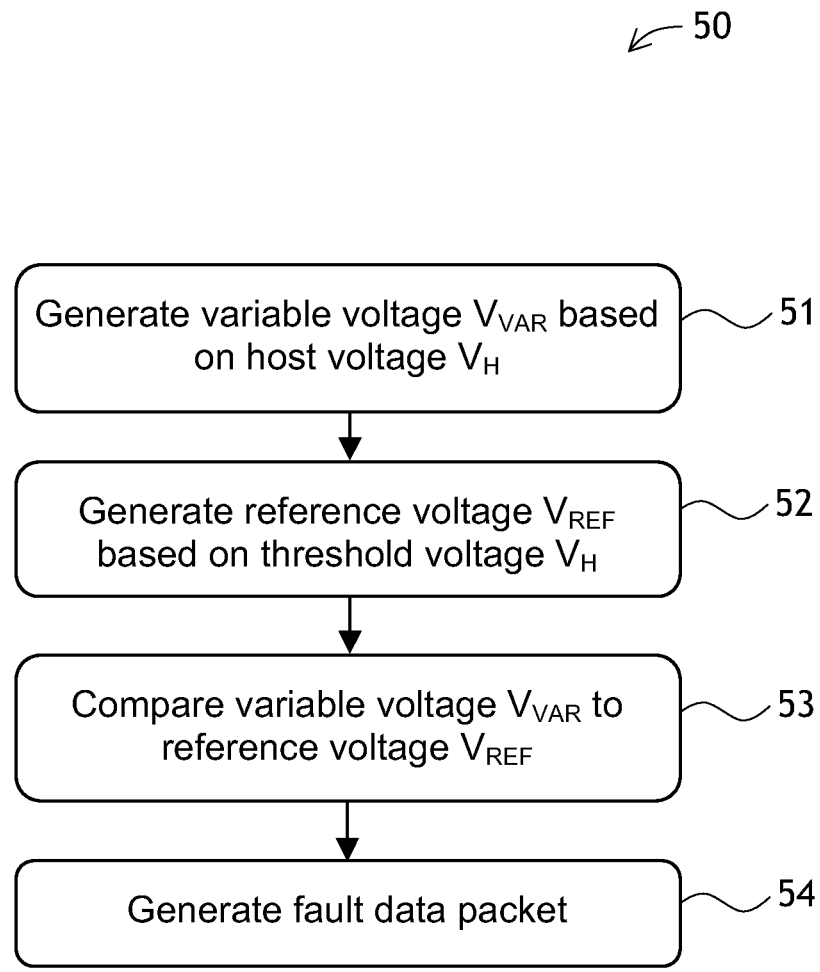
FIG. 5 illustrates a flow chart of a method for the transceiver of FIG. 1 or FIG. 4 to monitor and report a voltage supplied by a host.

Turning now to FIG. 5 with further reference to FIGS. 1, 2A, 2B, 3A, 3B, and FIG. 4, a method 50 (FIG. 5) for the transceiver 10 (FIG. 1) or 40 (FIG. 40) to report a host voltage loss includes a step 51 of generating the variable voltage $V_{VAR}$ based on the host voltage $V_H$, for example, as a pre-defined portion of the host voltage $V_H$. In a next step 52, the reference voltage $V_{REF}$ is generated. As explained above, the reference voltage $V_{REF}$ corresponds to the threshold voltage $V_{TH}$, a reduction of the host voltage below which indicates the host device 15 power failure.

In a next step 53, the variable voltage $V_{VAR}$ is compared to the reference voltage $V_{REF}$. Upon determining that the variable voltage $V_{VAR}$ is equal to or below the reference voltage $V_{REF}$, the fault data packet 16B is generated in a step 54. The fault data packet 16B generation has been explained above with reference to FIG. 4. The method 50 may allow a quick generation of the fault data packet, for example during a time interval of 25 microseconds or less.

The fault data packet 16B may be generated before the host voltage $V_H$ is at a level equal to or below the reference voltage $V_{REF}$ (FIG. 2B), which may be generated at a substantially constant level from the host voltage $V_H$. For embodiments where the reference voltage $V_{REF}$ is obtained from the substantially constant operating voltage $V_{OP}$ (e.g. FIG. 3B), the fault data packet 16B may be generated before the host voltage $V_H$ falls to a level of, or below the operating voltage $V_{OP}$. The comparator 27 (FIG. 2A) or 37 (FIG. 3A) may be used to compare the variable voltage $V_{VAR}$ to the reference voltage $V_{REF}$. The comparator 37 of FIG. 3A may be powered with the operating voltage $V_{OP}$. The operating voltage $V_{OP}$ may also be used to power the transceiver 10 of FIG. 1 and 40 of FIG. 4.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A transceiver for being hosted by a network communications device, the transceiver comprising:
   a transmitter for transmitting first data packets,
   a receiver for receiving second data packets,
   a packet processor coupled to the transmitter and the receiver for processing the first and second data packets;
   a connector coupled to the packet processor for transmitting and receiving the first and second data packets in electrical domain to and from a host device, and for providing a host voltage from the host device; and
   a host voltage monitor for providing a fault trigger signal for the packet processor to generate a fault data packet when the host voltage becomes equal to or drops below a predetermined threshold voltage,
   wherein the host voltage monitor comprises a comparator for comparing a reference voltage, corresponding to the predetermined threshold voltage, to a variable voltage based on the host voltage, and for providing the fault trigger signal to the packet processor when the variable voltage becomes equal to or drops below the reference voltage.

2. The transceiver of claim 1, wherein the packet processor comprises a fault packet generator responsive to the fault trigger signal, for generating the fault data packet upon receiving the fault trigger signal.

3. The transceiver of claim 1, wherein the host voltage monitor further comprises a DC-DC voltage converter for generating the reference voltage from the host voltage.

4. The transceiver of claim 3, wherein the host voltage monitor further comprises a voltage divider for generating the variable voltage as a pre-determined portion of the host voltage.

5. The transceiver of claim 4, wherein the pre-determined portion is between 0.2 and 0.6.

6. The transceiver of claim 1, wherein the host voltage monitor further comprises a DC-DC voltage converter for generating a substantially constant operating voltage from the host voltage.

7. The transceiver of claim 6, wherein the host voltage monitor further comprises a reference generator coupled to the DC-DC voltage converter for generating the reference voltage from the operating voltage.

8. The transceiver of claim 7, wherein a ratio of the reference voltage to the operating voltage is between 0.4 and 0.6.

9. The transceiver of claim 6, wherein the comparator is coupled to the DC-DC voltage converter, enabling the comparator to be powered by the operating voltage.

10. The transceiver of claim 9, wherein the packet processor comprises a DSP or FPGA powered by the operating voltage.

11. The transceiver of claim 10, wherein in operation, the DSP or FPGA have a processing speed enabling the generation of the fault data packet within 25 microseconds of receiving the fault trigger signal from the comparator.

12. The transceiver of claim 10, further comprising a SFP package, wherein the transmitter, the receiver, the packet processor, the connector, and the host voltage monitor are disposed within, or supported by, the SFP package.

13. The transceiver of claim 10, wherein the transmitter comprises electrical and optical transmitter portions each coupled to the packet processor,
   wherein the receiver comprises electrical and optical receiver portions each coupled to the packet processor, and
   wherein the electrical portions of the transmitter and the receiver are coupled to the connector for transmitting and receiving the first and second data packets in the electrical domain.

14. A method of reporting a host voltage loss by a transceiver hosted by a network communications device, the method comprising:
   (a) generating a variable voltage based on the host voltage;
   (b) generating a reference voltage corresponding to a threshold voltage, wherein a reduction of the host voltage to a level equal to or below the threshold voltage indicates an imminent host voltage loss;
   (c) comparing the variable voltage to the reference voltage; and
   (d) upon determining in step (c) that the variable voltage is at a level equal to or below the reference voltage, generating and transmitting a fault data packet before the host voltage becomes equal to or falls below the reference voltage.

15. The method of claim 14, wherein in step (b), the reference voltage is generated at a substantially constant level from the host voltage.

16. The method of claim 15, wherein a ratio of the reference voltage to the host voltage is 0.2 to 0.5.

17. The method of claim 14, wherein in step (c), a comparator is used to compare the variable voltage to the reference voltage, the method further comprising generating a substantially constant operating voltage from the host voltage, and powering the comparator with the operating voltage.

18. The method of claim 17, wherein step (a) comprises generating the variable voltage as a pre-defined portion of the host voltage.

19. The method of claim 18, wherein the pre-defined portion is between 0.2 and 0.6.

20. The method of claim 17, further comprising powering the transceiver with the operating voltage.

21. The method of claim 17, wherein step (b) comprises generating the reference voltage from the operating voltage.

22. The method of claim 14, wherein step (d) is completed during a time interval of 25 microseconds or less after determining in step (c) that the variable voltage is at a level equal to or below the reference voltage.

\* \* \* \* \*